(12) United States Patent
Tsamoura et al.

(10) Patent No.: US 12,505,345 B2
(45) Date of Patent: Dec. 23, 2025

(54) METHOD AND SYSTEM FOR SCENE GRAPH GENERATION

(71) Applicant: SAMSUNG ELECTRONICS CO., LTD., Suwon-si (KR)

(72) Inventors: Efthymia Tsamoura, Chertsey (GB); Davide Buffelli, Chertsey (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 883 days.

(21) Appl. No.: 17/824,571

(22) Filed: May 25, 2022

(65) Prior Publication Data

US 2022/0391704 A1 Dec. 8, 2022

(30) Foreign Application Priority Data

May 25, 2021 (GR) .............................. 20210100345
Dec. 10, 2021 (GB) .................................... 2117872

(51) Int. Cl.
*G06N 3/08* (2023.01)
*G06N 3/04* (2023.01)
(Continued)

(52) U.S. Cl.
CPC ................. *G06N 3/08* (2013.01); *G06N 3/04* (2013.01); *G06V 10/751* (2022.01);
(Continued)

(58) Field of Classification Search
CPC .......... G06N 3/08; G06N 3/04; G06V 10/771; G06V 10/82; G06V 10/751; G06V 10/774
See application file for complete search history.

(56) References Cited

U.S. PATENT DOCUMENTS 11,361,550 B2 * 6/2022 Herdade ................... G06T 7/73
12,026,226 B2 * 7/2024 Savvides ............. G06F 18/2136
(Continued)

OTHER PUBLICATIONS

Hai Wan, et al., Iterative Visual Relationship Detection via Commonsense Knowledge Graph, Big Data Research, vol. 23, Feb. 15, 2021, 100175, ISSN 2214-5796, https://doi.org/10.1016/j.bdr.2020.100175. (https://www.sciencedirect.com/science/article/pii/S2214579620300435) (Year: 2021).*

(Continued)

*Primary Examiner* — Barbara M Level
(74) *Attorney, Agent, or Firm* — Sughrue Mion, PLLC

(57) ABSTRACT

Broadly speaking, the disclosure generally relates to relates to a computer-implemented methods and systems for scene graph generation, and in particular for training a machine learning, ML, model to generate a scene graph. The method includes inputting training a training image into a machine learning model, outputting a predicted label for at least two objects in the training image and a predicted label for a relationship between the at least two objects. The training method includes calculating a loss, which takes into account both a supervised loss calculated by comparing the predicted labels to the actual labels for the training image, and a logic-based loss calculated by comparing the predicted labels to stored integrity constraints comprising commonsense knowledge. Advantageously, this means that the performance of the model is improved without increasing processing at inference-time.

12 Claims, 17 Drawing Sheets

(51) Int. Cl.
  *G06V 10/75* (2022.01)
  *G06V 10/771* (2022.01)
  *G06V 10/774* (2022.01)
  *G06V 10/82* (2022.01)
  *G06V 10/84* (2022.01)

(52) U.S. Cl.
  CPC .......... *G06V 10/771* (2022.01); *G06V 10/774* (2022.01); *G06V 10/82* (2022.01); *G06V 10/84* (2022.01)

(56) References Cited

U.S. PATENT DOCUMENTS

| | | | | |
|---|---|---|---|---|
| 2017/0132526 | A1* | 5/2017 | Cohen | G06N 20/00 |
| 2018/0089540 | A1* | 3/2018 | Merler | G06V 10/764 |
| 2020/0364553 | A1* | 11/2020 | Amos | G06N 3/08 |
| 2020/0401835 | A1* | 12/2020 | Zhao | G06V 10/426 |
| 2021/0374489 | A1* | 12/2021 | Prakash | G06V 20/70 |

OTHER PUBLICATIONS

Communication dated May 24, 2022, issued by the Great Britain Intellectual Property Office in Great Britain Patent Application No. GB2117872.8.
Hou et al., "Relational Reasoning using Prior Knowledge for Visual Captioning," arXiv:1906.01290v1 [cs.CV], Jun. 4, 2019, Total 10 pages.
Zareian et al., "Learning Visual Commonsense for Robust Scene Graph Generation," arXiv:2006.09623v2 [cs.CV], Jul. 18, 2020, Total 20 pages.
Somak Aditya et al., "Explicit Reasoning over End-to-End Neural Architectures for Visual Question Answering", The Thirty-Second AAAI Conference on Artificial Intelligence (AAAI-18), 2018, 9 pages total.
Somak Aditya et al., "Integrating Knowledge and Reasoning in Image Understanding", Proceedings of the Twenty-Eighth International Joint Conference on Artificial Intelligence (IJCAI-19), 2019, 8 pages total.
Somak Aditya et al., "Combining Knowledge and Reasoning through Probabilistic Soft Logic for Image Puzzle Solving", 2018, 11 pages total.
Somak Aditya et al., "Visual Commonsense for Scene Understanding Using Perception, Semantic Parsing and Reasoning", Logical Formalizations of Commonsense Reasoning: Papers from the 2015 AAAI Spring Symposium, 2015, 8 pages total.
Stephen H. Bach et al., "Hinge-Loss Markov Random Fields and Probabilistic Soft Logic", Journal of Machine Learning Research, 18, 2017, 67 pages total.
Mark Chavira et al., "On probabilistic inference by weighted model counting", Artificial Intelligence, 172, 2007, 28 pages total.
Tianshui Chen et al., "Knowledge-Embedded Routing Network for Scene Graph Generation", Computer Vision Foundation, 2019, 9 pages total.
Bo Dai et al., "Detecting Visual Relationships with Deep Relational Networks", Computer Vision Foundation, 2017, 11 pages total.
Wang-Zhou Dai et al., "Bridging Machine Learning and Logical Reasoning by Abductive Learning", 33rd Conference on Neural Information Processing Systems (NeurIPS 2019), 2019, 12 pages total.
Artur S. d'Avila Garcez, Krysia Broda, and Dov M. Gabbay, "Neural-symbolic learning systems: foundations and applications", Perspectives in neural computing, Springer, 2002, 1 page total.
Ivan Donadello et al., "Logic Tensor Networks for Semantic Image Interpretation", Proceedings of the Twenty-Sixth International Joint Conference on Artificial Intelligence (IJCAI-17), 2017, 7 pages total.
Marc Fischer et al., "DL2: Training and Querying Neural Networks with Logic", Proceedings of the 36th International Conference on Machine Learning, 2019, 11 pages total.
Alexander L. Gaunt et al., "Differentiable Programs with Neural Libraries", Proceedings of the 34th International Conference on Machine Learning, 2017, 10 pages total.
Jiuxiang Gu et al., "Scene Graph Generation with External Knowledge and Image Reconstruction", arXiv:1904.00560v1, Apr. 2019, 10 pages total.
Zhiting Hu et al., "Harnessing Deep Neural Networks with Logic Rules", ACL, 2016, 13 pages total.
Zhiting Hu et al., "Deep Neural Networks with Massive Learned Knowledge", EMNLP, 2016, 10 pages total.
Alex Kendall et al., "Multi-Task Learning Using Uncertainty to Weigh Losses for Scene Geometry and Semantics", Computer Vision Foundation, 2018, 10 pages total.
Ranjay Krishna et al., "Visual Genome Connecting Language and Vision Using Crowdsourced Dense Image Annotations", arXiv:1602.07332v1, Feb. 2016, 44 pages total.
Yikang Li et al., "Scene Graph Generation from Objects, Phrases and Region Captions", arXiv:1707.09700v2, ICCV, Sep. 2017, 10 pages total.
Yuanzhi Liang et al., "VrR-VG: Refocusing Visually-Relevant Relationships", Computer Vision Foundation, ICCV, 2019, 10 pages total.
Ben London et al., "Collective Activity Detection using Hinge-loss Markov Random Fields", Computer Vision Foundation, 2013, 6 pages total.
Cewu Lu et al., "Visual Relationship Detection with Language Priors", ECCV, 2016, 19 pages total.
Robin Manhaeve et al., "DeepProbLog: Neural Probabilistic Logic Programming", 32nd Conference on Neural Information Processing Systems (NeurIPS 2018), 2018, 11 pages total.
Kenneth Marino et al., "The More You Know: Using Knowledge Graphs for Image Classification", Computer Vision Foundation, 2017, 9 pages total.
Giuseppe Marra et al., "Relational Neural Machines", 24th European Conference on Artificial Intelligence—ECAI, 2020, 8 pages total.
Giuseppe Marra et al., "Integrating Learning and Reasoning with Deep Logic Models", 2019, 16 pages total.
Pasquale Minervini et al., "Adversarially Regularising Neural NLI Models to Integrate Logical Background Knowledge", Proceedings of the 22nd Conference on Computational Natural Language Learning (CoNLL 2018), 2018, 10 pages total.
Mengshi Qi et al., "Attentive Relational Networks for Mapping Images to Scene Graphs", Computer Vision Foundation, 2019, 10 pages total.
Tim Rocktäschel et al., "End-to-End Differentiable Proving", 31st Conference on Neural Information Processing Systems (NIPS 2017), 2017, 13 pages total.
Tim Rocktäschel et al., "Injecting Logical Background Knowledge into Embeddings for Relation Extraction", ACL, 2015, 11 pages total.
Maarten Sap et al., "ATOMIC: An Atlas of Machine Commonsense for If-Then Reasoning", arXiv:1811.00146v3, Association for the Advancement of Artificial Intelligence, Feb. 2019, 9 pages total.
Robyn Speer et al., "ConceptNet 5.5: An Open Multilingual Graph of General Knowledge", Proceedings of the Thirty-First AAAI Conference on Artificial Intelligence (AAAI-17), 2017, 8 pages total.
Kaihua Tang et al., "Unbiased Scene Graph Generation from Biased Training", Computer Vision Foundation, 2020, 10 pages total.
Kaihua Tang et al., "Learning to Compose Dynamic Tree Structures for Visual Contexts", Computer Vision Foundation, 2019, 10 pages total.
Efthymia Tsamoura et al., "Neural-Symbolic Integration: A Compositional Perspective", The Thirty-Fifth AAAI Conference on Artificial Intelligence (AAAI-21), 2021, 10 pages total.
Emile Van Krieken et al., "Semi-Supervised Learning Using Differentiable Reasoning", arXiv:1908.04700v1, Journal of Applied Logics—IfCoLog Journal of Logics and their Applications, vol. 6. No. 4, Aug. 2019, 18 pages total.
Emile van Krieken et al., "Analyzing Differentiable Fuzzy Implications", Proceedings of the 17th International Conference on

(56) References Cited

OTHER PUBLICATIONS

Principles of Knowledge Representation and Reasoning (KR 2020) Special Session on KR and Machine Learning, 2020, 11 pages total.
Hai Wang et al., "Deep Probabilistic Logic: A Unifying Framework for Indirect Supervision", Proceedings of the 2018 Conference on Empirical Methods in Natural Language Processing, 2018, 12 pages total.
Peng Wang et al., "FVQA: Fact-based Visual Question Answering", arXiv:1606.05433v4, IEEE Transactions on Pattern Analysis and Machine Intelligence, Aug. 2017, 16 pages total.
Po-Wei Wang et al., "SATNet: Bridging deep learning and logical reasoning using a differentiable satisfiability solver", arXiv:1905.12149v1, Proceedings of the 36th International Conference on Machine Learning, May 2019, 14 pages total.
Wenbin Wang et al., "Exploring Context and Visual Pattern of Relationship for Scene Graph Generation", Computer Vision Foundation, 2019, 10 pages total.
Wenya Wang et al., "Integrating Deep Learning with Logic Fusion for Information Extraction", The Thirty-Fourth AAAI Conference on Artificial Intelligence (AAAI-20), 2020, 8 pages total.
Sanghyun Woo et al., "LinkNet: Relational Embedding for Scene Graph", 32nd Conference on Neural Information Processing Systems (NeurIPS 2018), 2018, 11 pages total.
Qi Wu et al., "Ask Me Anything: Free-form Visual Question Answering Based on Knowledge from External Sources", Computer Vision Foundation, 2016, 9 pages total.
Danfei Xu et al., "Scene Graph Generation by Iterative Message Passing", Computer Vision Foundation, 2017, 10 pages total.
Jingyi Xu et al., "A Semantic Loss Function for Deep Learning with Symbolic Knowledge", Proceedings of the 35th International Conference on Machine Learning, 2018, 10 pages total.
Jianwei Yang et al., "Graph R-CNN for Scene Graph Generation", Computer Vision Foundation, ECCV, 2018, 16 pages total.
Zhun Yang et al., "NeurASP: Embracing Neural Networks into Answer Set Programming", Proceedings of the Twenty-Ninth International Joint Conference on Artificial Intelligence (IJCAI-20), 2020, 8 pages total.
Guojun Yin et al., "Zoom-Net: Mining Deep Feature Interactions for Visual Relationship Recognition", Computer Vision Foundation, ECCV, 2018, 17 pages total.
Alireza Zareian et al., "Learning Visual Commonsense for Robust Scene Graph Generation", ECCV, 2020, 16 pages total.
Rowan Zellers et al., "Neural Motifs: Scene Graph Parsing with Global Context", Computer Vision Foundation, 2018, 10 pages total.
Hanwang Zhang et al., "Visual Translation Embedding Network for Visual Relation Detection", Computer Vision Foundation, 2017, 9 pages total.
Yuke Zhu et al., "Reasoning About Object Affordances in a Knowledge Base Representation", ECCV, vol. 8690, 2014, 29 pages total.
Joseph Redmon et al., "You Only Look Once: Unified, Real-Time Object Detection", Computer Vision Foundation, 2016, 10 pages total.
Shaoqing Ren et al., "Faster R-CNN: Towards Real-Time Object Detection with Region Proposal Networks", arXiv:1506.01497v2, NeurIPS, Sep. 2015, 10 pages total.

\* cited by examiner

FIG. 5

| eye | drinks | horse | W (I,w) |
|---|---|---|---|
| ⊥ | ⊥ | ⊥ | $(1-\omega(e)) \times (1-\omega(d)) \times (1-\omega(h))$ |
| ⊥ | ⊥ | ⊤ | $(1-\omega(e)) \times (1-\omega(d)) \times \omega(h)$ |
| ⊥ | ⊤ | ⊥ | $(1-\omega(e)) \times \omega(d) \times (1-\omega(h))$ |
| ⊥ | ⊤ | ⊤ | $(1-\omega(e)) \times \omega(d) \times \omega(h)$ |
| ⊤ | ⊥ | ⊥ | $\omega(e) \times (1-\omega(d)) \times (1-\omega(h))$ |
| ⊤ | ⊥ | ⊤ | $\omega(e) \times (1-\omega(d)) \times \omega(h)$ |
| ⊤ | ⊤ | ⊥ | $\omega(e) \times \omega(d) \times (1-\omega(h))$ |
| ⊤ | ⊤ | ⊤ | 0 |

FIG. 8A

| Model | Reg. | Predicate Classification | | | | | | Scene Graph Classification | | | | | |
|---|---|---|---|---|---|---|---|---|---|---|---|---|---|
| | | mR@ | | | zsR@ | | | mR@ | | | zsR@ | | |
| | | 20 | 50 | 100 | 20 | 50 | 100 | 20 | 50 | 100 | 20 | 50 | 100 |
| IMP | – | 9.26 | 11.43 | 12.23 | 12.23 | 17.28 | 19.92 | 5.57 | 6.31 | 6.74 | 2.04 | 3.47 | 3.90 |
| IMP | TTR(DL2) | 11.16 | 14.17 | 15.41 | 12.83 | 18.44 | 21.70 | 4.35 | 5.75 | 6.50 | 1.49 | 2.27 | 2.81 |
| IMP | TTR(WMC) | 11.29 | 14.22 | 15.30 | 12.84 | 18.75 | 21.84 | 6.99 | 8.45 | 8.92 | 2.71 | 4.48 | 5.35 |
| MOTIFS | – | 12.65 | 16.08 | 17.35 | 1.21 | 3.34 | 5.57 | 6.81 | 8.31 | 8.85 | 0.33 | 0.65 | 1.13 |
| MOTIFS | TTR(DL2) | 7.30 | 10.38 | 12.22 | 0.27 | 0.69 | 1.22 | 4.55 | 6.02 | 6.61 | 0.25 | 0.47 | 0.67 |
| MOTIFS | TTR(WMC) | 12.94 | 16.44 | 17.76 | 1.31 | 3.57 | 5.74 | 8.16 | 10.00 | 10.54 | 0.49 | 1.05 | 1.58 |
| VCTree | – | 13.07 | 16.75 | 18.11 | 1.04 | 3.28 | 5.52 | 9.29 | 11.42 | 12.12 | 0.48 | 1.37 | 2.09 |
| VCTree | TTR(DL2) | 13.49 | 17.19 | 18.70 | 1.24 | 3.41 | 5.66 | 4.79 | 6.02 | 6.43 | 0.21 | 0.59 | 0.80 |
| VCTree | TTR(WMC) | 13.69 | 17.51 | 18.92 | 1.29 | 3.85 | 6.04 | 9.89 | 11.75 | 12.35 | 0.67 | 1.56 | 2.44 |

FIG. 8B

| Model | Reg. | Predicate Classification | | | | | | Scene Graph Classification | | | | | |
|---|---|---|---|---|---|---|---|---|---|---|---|---|---|
| | | mR@ | | | zsR@ | | | mR@ | | | zsR@ | | |
| | | 20 | 50 | 100 | 20 | 50 | 100 | 20 | 50 | 100 | 20 | 50 | 100 |
| VCTree | – | 13.07 | 16.75 | 18.11 | 1.04 | 3.28 | 5.52 | 9.29 | 11.42 | 12.12 | 0.48 | 1.37 | 2.09 |
| VCTree | TTR | 13.69 | 17.51 | 18.92 | 1.29 | 3.85 | 6.04 | 9.89 | 11.75 | 12.35 | 0.67 | 1.56 | 2.44 |
| VCTree+TDE | – | 19.40 | 25.94 | 29.48 | 8.14 | 12.38 | 14.07 | 10.51 | 14.53 | 16.73 | 1.48 | 2.54 | 3.99 |
| VCTree+TDE | TTR | 23.91 | 30.78 | 34.19 | 8.15 | 12.47 | 15.41 | 13.60 | 17.69 | 19.85 | 1.57 | 2.63 | 3.63 |

FIG. 8E

| Reg. | #ICs | Predicate Classification | | | | | | | Scene Graph Classification | | | | | | |
|---|---|---|---|---|---|---|---|---|---|---|---|---|---|---|---|
| | | mR@ | | | zsR@ | | | Time (s) | mR@ | | | zsR@ | | | Time (s) |
| | | 20 | 50 | 100 | 20 | 50 | 100 | | 20 | 50 | 100 | 20 | 50 | 100 | |
| - | 0 | 19.40 | 25.94 | 29.48 | 8.14 | 12.38 | 14.07 | 330.85 | 10.51 | 14.53 | 16.73 | 1.48 | 2.54 | 3.99 | 370.22 |
| TTR | 2 | 23.91 | 30.78 | 34.19 | 8.15 | 12.47 | 15.41 | 367.14 | 13.60 | 17.69 | 19.85 | 1.57 | 2.63 | 3.63 | 437.44 |
| TTR | 3 | 23.99 | 31.31 | 35.10 | 6.72 | 10.61 | 13.36 | 389.29 | 13.18 | 17.23 | 19.42 | 1.67 | 3.00 | 3.95 | 617.89 |
| TTR | 5 | 23.90 | 31.22 | 35.17 | 6.81 | 10.69 | 13.24 | 487.04 | 13.50 | 17.31 | 19.70 | 2.74 | 4.09 | 5.12 | 725.62 |
| TTR | 7 | 24.75 | 32.14 | 35.82 | 7.17 | 10.81 | 13.68 | 540.01 | 12.57 | 17.22 | 19.33 | 1.64 | 2.93 | 3.59 | 834.85 |
| TTR | 10 | 24.32 | 31.59 | 35.11 | 6.10 | 10.52 | 13.26 | 606.95 | 12.29 | 17.15 | 19.26 | 1.68 | 2.94 | 3.83 | 983.34 |

FIG. 8F

| Model | Reg. | Predicate Classification | | | | | | Scene Graph Classification | | | | | |
|---|---|---|---|---|---|---|---|---|---|---|---|---|---|
| | | mR@ | | | zsR@ | | | mR@ | | | zsR@ | | |
| | | 20 | 50 | 100 | 20 | 50 | 100 | 20 | 50 | 100 | 20 | 50 | 100 |
| VCTree | – | 13.07 | 16.75 | 18.11 | 1.04 | 3.28 | 5.52 | 9.29 | 11.42 | 12.12 | 0.48 | 1.37 | 2.09 |
| VCTree | TTR | 13.69 | 17.51 | 18.92 | 1.29 | 3.85 | 6.04 | 9.89 | 11.75 | 12.35 | 0.67 | 1.56 | 2.44 |
| VCTree + TDE | – | 19.40 | 25.94 | 29.48 | 8.14 | 12.38 | 14.07 | 10.51 | 14.53 | 16.73 | 1.48 | 2.54 | 3.99 |
| VCTree + TDE | TTR | 23.91 | 30.78 | 34.19 | 8.15 | 12.47 | 15.41 | 13.60 | 17.69 | 19.85 | 1.57 | 2.63 | 3.63 |
| VCTree | – | 13.07 | 16.75 | 18.11 | 1.04 | 3.28 | 5.52 | 9.29 | 11.42 | 12.12 | 0.48 | 1.37 | 2.09 |
| VCTree | ITR$_\Sigma$ | 13.71 | 17.27 | 18.58 | 1.37 | 3.80 | 6.38 | 9.36 | 11.49 | 12.19 | 0.51 | 1.40 | 2.17 |
| VCTree + TDE | – | 19.40 | 25.94 | 29.48 | 8.14 | 12.38 | 14.07 | 10.51 | 14.53 | 16.73 | 1.48 | 2.54 | 3.99 |
| VCTree + TDE | ITR$_\Sigma$ | 19.43 | 26.06 | 29.62 | 8.33 | 12.74 | 14.61 | 10.55 | 14.66 | 16.89 | 1.56 | 2.71 | 4.37 |

FIG. 8G

| Model | Plug-in | Predicate Classification | | | | | | Scene Graph Classification | | | | | |
|---|---|---|---|---|---|---|---|---|---|---|---|---|---|
| | | mR@ | | | zsR@ | | | mR@ | | | zsR@ | | |
| | | 20 | 50 | 100 | 20 | 50 | 100 | 20 | 50 | 100 | 20 | 50 | 100 |
| IMP | – | 9.26 | 11.43 | 12.23 | 12.23 | 17.28 | 19.92 | 5.57 | 6.31 | 6.74 | 2.04 | 3.47 | 3.90 |
| IMP | LL(WMC) | 11.29 | 14.22 | 15.30 | 12.84 | 18.75 | 21.84 | 6.99 | 8.45 | 8.92 | 2.71 | 4.48 | 5.35 |
| IMP | GLAT | 10.04 | 12.44 | 13.30 | 11.87 | 17.04 | 19.72 | 5.95 | 6.75 | 7.17 | 2.09 | 3.40 | 3.82 |
| N-MOTIF | – | 12.65 | 16.08 | 17.35 | 1.21 | 3.34 | 5.57 | 6.81 | 8.31 | 8.85 | 0.33 | 0.65 | 1.13 |
| N-MOTIF | LL(WMC) | 12.94 | 16.44 | 17.76 | 1.31 | 3.57 | 5.74 | 8.16 | 10.00 | 10.54 | 0.49 | 1.05 | 1.58 |
| N-MOTIF | GLAT | 12.82 | 16.26 | 17.60 | 1.26 | 3.49 | 5.79 | 6.84 | 8.34 | 8.89 | 0.32 | 0.63 | 1.12 |
| VCTree | – | 13.07 | 16.75 | 18.11 | 1.04 | 3.28 | 5.52 | 9.29 | 11.42 | 12.12 | 0.48 | 1.37 | 2.09 |
| VCTree | LL(WMC) | 13.69 | 17.51 | 18.92 | 1.29 | 3.85 | 6.04 | 9.89 | 11.75 | 12.35 | 0.67 | 1.56 | 2.44 |
| VCTree | GLAT | 13.88 | 17.51 | 18.90 | 1.28 | 3.87 | 6.43 | 9.39 | 11.52 | 12.20 | 0.51 | 1.42 | 2.17 |

METHOD AND SYSTEM FOR SCENE GRAPH GENERATION

CROSS-REFERENCE TO RELATED APPLICATION(S)

This application is based on and claims priority under 35 U.S.C. § 119 from Greek Application No. 20210100345, filed on May 25, 2021, in the Greek Intellectual Property Office and a United Kingdom Patent Application No. 2117872.8, filed on Dec. 10, 2021, in the United Kingdom Patent Office, the disclosure of which is incorporated by reference herein in its entirety.

TECHNICAL FIELD

The disclosure generally relates to a computer-implemented methods and systems for scene graph generation. In particular, the disclosure relates to a method and a system for training a machine learning, ML, model to generate a scene graph, and a method and system for generating a scene graph using the trained model.

BACKGROUND ART

The computer vision task of scene graph generation (SGG) is that of processing an image to identify objects therein and relationships between the identified objects. Particularly, given an image, SGG involves generating triples of the form (subject, predicate, object). These triples can, if desired, be assembled into a scene graph describing the relationships between the objects. The triples or resulting graph can be used in a wide range of applications, including image retrieval, visual question answering and activity detection by smart assistants.

Various challenges arise in SGG. Often the ground truth used as training data will be incomplete, because not all objects in a scene will be annotated, nor will all of the relations between the objects. Furthermore, correctly identifying the order of the relationships is important—a horse can have a tail, but a tail cannot have a horse.

DESCRIPTION OF EMBODIMENTS

Technical Problem

Some existing approaches for SGG rely exclusively on neural network techniques to generate the triples. However, this involves the use of huge amounts of training data. Other approaches have recognised that relationships between objects rely on common sense and have attempted to use symbolic logic to leverage common sense knowledge stored in knowledge bases. However, these approaches are based on inference-time regularisation, in which outputs of a neural network that violate common sense logical rules are corrected at inference-time.

Therefore, the present applicant has recognised the need for an improved technique for SGG that efficiently leverages common sense knowledge at training-time.

Technical Solution to Problem

In accordance with an aspect of the disclosure, there is provided a computer-implemented method for training a machine learning model comprising a plurality of neural network layers for scene graph generation, SGG, comprising: inputting a training image into the machine learning model, the training image depicting a scene comprising at least two objects; outputting, from the machine learning model, a predicted label for the each of the at least two objects and a predicted label for a relationship between the at least two objects; calculating a loss; and updating, based on the calculated loss, weights for computation by the plurality of neural network layers of the machine learning model, wherein calculating the loss comprises: calculating a supervised loss by comparing the predicted label for the each of the at least two objects and the predicted label for a relationship between the at least two objects to actual labels corresponding to the training image; and calculating a logic-based loss by comparing the predicted label for the each of the at least two objects and the predicted label for a relationship between the at least two objects to a plurality of stored integrity constraints, wherein the integrity constraints comprise common-sense knowledge.

According to an embodiment of the disclosure, calculating the logic-based loss may comprise: selecting a maximally non-satisfied subset of the plurality of stored integrity constraints, and calculating the logic-based loss based on the maximally non-satisfied subset.

According to an embodiment of the disclosure, selecting the maximally non-satisfied subset may comprise: obtaining output predictions of the machine learning model with highest confidences; ordering the obtained output predictions by decreasing confidence; removing any prediction of the obtained output predictions for which there is no corresponding negative integrity constraint in the plurality of stored integrity constraints; selecting random subsets of the obtained output predictions; calculating a loss is calculated for each of the random subsets; and selecting the maximum loss corresponding to the random subsets as the logic-based loss.

According to an embodiment of the disclosure, the logic-based loss may be inversely proportional to a satisfaction function, which measures how closely the output prediction for the each of the at least two objects and the output prediction for the relationship between the at least two objects satisfies the plurality of stored integrity constraints.

According to an embodiment of the disclosure, the logic-based loss may be calculated using probabilistic logic, suitably using weighted model counting. The logic-based loss may be calculated using fuzzy logic, suitably using DL2.

According to an embodiment of the disclosure, the plurality of stored integrity constraints may comprise positive integrity constraints expressing permissible relationships between objects. The plurality of stored integrity constraints may comprise negative integrity constraints expressing impermissible relationships between objects. The plurality of stored integrity constraints may be selected from a common sense knowledge base, suitably ConceptNet or ATOMIC.

According to an embodiment of the disclosure, updating the weights may comprise using backpropagation to update the weights.

In accordance with another aspect of the disclosure, there is provided a system comprising at least one processor and a memory coupled to the processor, the processor configured to carry out the method of the first approach.

According to an embodiment of the disclosure, the features described above with respect to the first approach apply equally to the second approach.

In accordance with another aspect of the disclosure, there is provided a computer-implemented method of generating a scene graph, comprising: receiving an input image, and generating a scene graph using a machine learning model trained according to the method of the first approach.

According to an embodiment of the disclosure, the method of the third approach and the method of the first approach may be combined. Accordingly, the disclosure provides a method of generating a scene graph comprising training a machine learning model as set out in the first approach and generating the scene graph as set out in the second approach.

In accordance with another aspect of the disclosure, there is provided a system comprising:
at least one processor; a memory coupled to the processor, the memory storing a machine learning model trained according to the method of the first approach, wherein the processor is configured to: generate a scene graph from an input image using the machine learning model.

According to an embodiment of the disclosure, the memory may be configured to store a plurality of images. The system may comprise a user interface configured to receive an image search query, the image search query including a label of an object in an image to be retrieved and a label of a relationship involving the object. The processor may be further configured to: generate scene graphs corresponding to the plurality of images; and select an image of the plurality of images corresponding to a scene graph that includes the label of the object and the label of the relationship included in the query.

According to an embodiment of the disclosure, the system may comprise an image capture unit configured to capture an image of a user performing an activity. The processor may be configured to generate a scene graph based on the captured image of the user performing the activity. The processor may be further configured to determine whether the user is performing the activity correctly. The memory may store a plurality of permitted actions associated with the activity, and the processor may be configured to determine whether the user is performing one of the permitted actions. The system may comprise a user interface, wherein the processor is configured to alert the user if it is determined that the activity is not being performed correctly via the user interface.

In a related approach of the disclosure, there may be provided a non-transitory data carrier storing a machine learning model trained according to the first approach.

In a related approach of the disclosure, there may be provided a non-transitory data carrier carrying processor control code to implement the methods described herein.

As will be appreciated by one skilled in the art, an embodiment of the disclosure may be embodied as a system, method or computer program product. Accordingly, an embodiment of the disclosure may take the form of an entirely hardware embodiment, an entirely software embodiment, or an embodiment combining software and hardware aspects.

Furthermore, an embodiment of the disclosure may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of an embodiment of the disclosure may be written in any combination of one or more programming languages, including object oriented programming languages, functional programming languages, and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the disclosure also may provide a non-transitory data carrier carrying code which, when implemented on a processor, causes the processor to carry out any of the methods described herein.

In accordance with an aspect of the disclosure, there is provided a non-transitory machine-readable medium comprising instructions that, when executed by at least one processor of an electronic device, cause the at least one processor to train a machine learning model comprising a plurality of neural network layers for scene graph generation, SGG, by inputting the training image into the machine learning model, the training image depicting a scene comprising at least two objects; outputting, from the machine learning model, a predicted label for the each of the at least two objects and a predicted label for a relationship between the at least two objects; calculating a loss; and updating, based on the calculated loss, weights for computation by the plurality of neural network layers of the machine learning model, wherein calculating the loss comprises: calculating a supervised loss by comparing the predicted label for the each of the at least two objects and the predicted label for a relationship between the at least two objects to actual labels corresponding to the training image; and calculating a logic-based loss by comparing the predicted label for the each of the at least two objects and the predicted label for a relationship between the at least two objects to a plurality of stored integrity constraints, wherein the integrity constraints comprise common-sense knowledge.

An embodiment of the disclosure may further provide processor control code to implement the above-described methods, for example on a general purpose computer system or on a digital signal processor (DSP). The embodiment of the disclosure may also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the disclosure described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The embodiment of the disclosure may comprise a controller which includes a microprocessor, working memory and program memory coupled to one or more of the components of the system.

It will also be clear to one of skill in the art that all or part of a logical method according to embodiments of an embodiment of the disclosure may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the disclosure may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, an embodiment of the disclosure may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

BRIEF DESCRIPTION OF DRAWINGS

Implementations of the some embodiments of disclosure will now be described, by way of example only, with reference to the accompanying drawings, in which:

FIG. 5 is a table illustrating weighted model counting of an integrity constraint;

FIG. 8A is a table illustrating performance of an embodiment of the disclosure;

FIG. 8B is a table illustrating performance of an embodiment of the disclosure;

FIG. 8E is a table illustrating performance of an embodiment of the disclosure;

FIG. 8F is a table illustrating performance of an embodiment of the disclosure;

FIG. 8G is a table illustrating performance of an embodiment of the disclosure;

MODE OF DISCLOSURE

Broadly speaking, an embodiment of the disclosure generally relate to relates to a computer-implemented methods and systems for scene graph generation, and in particular for training a machine learning, ML, model to generate a scene graph. The method includes inputting training a training image into a machine learning model, outputting a predicted label for at least two objects in the training image and a predicted label for a relationship between the at least two objects. The training method includes calculating a loss, which takes into account both a supervised loss calculated by comparing the predicted labels to the actual labels for the training image, and a logic-based loss calculated by comparing the predicted labels to stored integrity constraints comprising common-sense knowledge. Advantageously, this means that the performance of the model is improved without increasing processing at inference-time.

Figure 1:
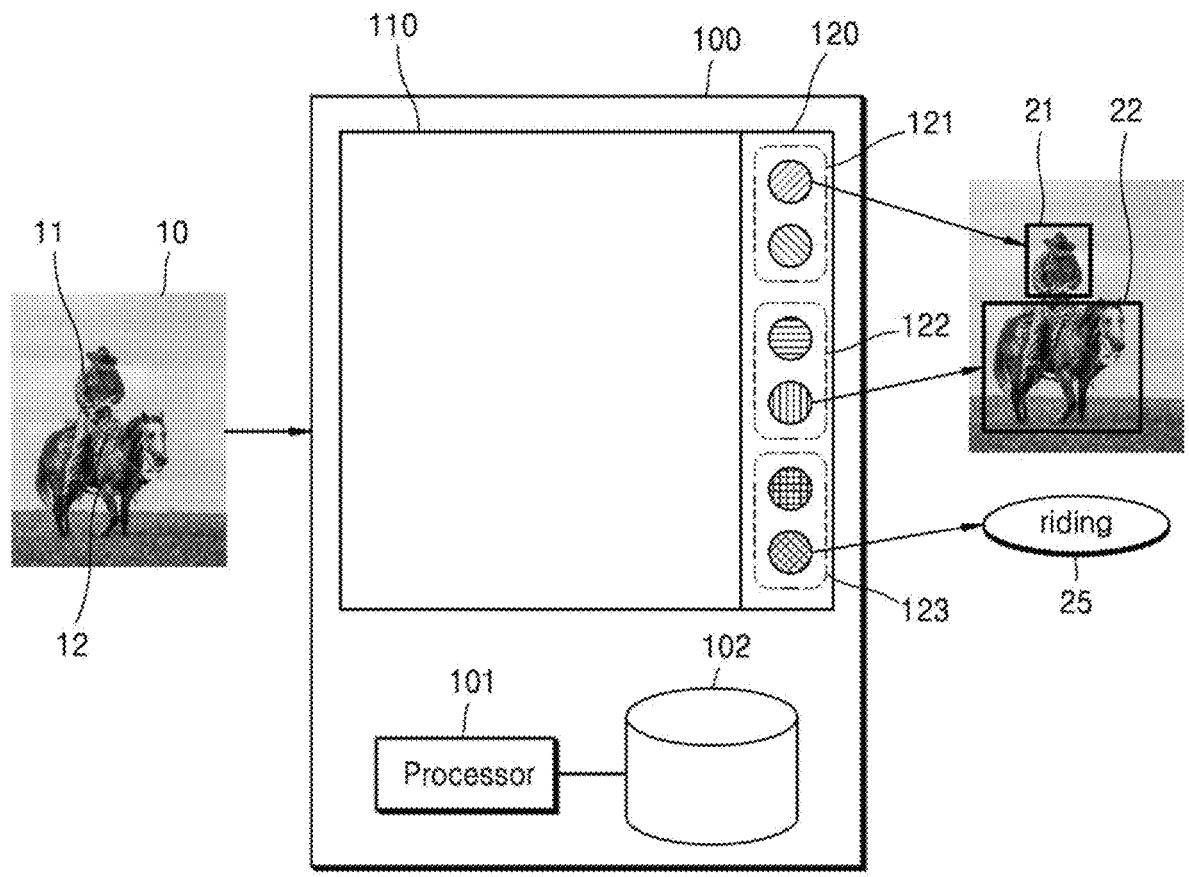
FIG. 1 is a schematic diagram of an example system for scene graph generation.

FIG. 1 illustrates an example system 100 for scene graph generation (SGG) according to an embodiment of the disclosure.

The system 100 receives an input image 10. The input image 10 includes at least two objects. In the example shown, the image 10 objects in the form of a man 11 and a horse 12. It will be appreciated that this is merely an example and that input images 10 to the system 100 may include a wide variety of objects, and more than two objects.

The system 100 includes a machine learning model 110, which will be discussed in more detail below. The machine learning model 110 includes a plurality of neural network layers.

The plurality of neural network layers includes an output layer 120. The output layer 120 comprises a plurality of neurons, which provide the output 20 of the machine learning model 110.

The output layer 120 comprises a first set of neurons 121 that provide an output 21 identifying a first object in the image 10, for example using a bounding box, and providing a label for the identified first object. In the example of FIG. 1, the first object identified is the man 11.

The output layer 120 also comprises a second set of neurons 122 that provide an output 22 identifying a second object in the image 10, for example using a bounding box and providing a label for the identified second object. In the example of FIG. 1, the second object identified is the horse 12.

The output layer 120 further comprises a third set of neurons 123, which provide an output 25 identifying a relationship between the first object 11 and the second object 12. In the example show, the identified relationship is "riding". The relationship is a semantic relationship, and may be directional. In other words, "a man riding a horse" and "a horse riding a man" represent two different relationships. As such, it is important which object is identified as the first object 11 and which object is identified as the second object 12.

Throughout this disclosure, the first object 11 may also be referred to as the "subject", the second object 12 may also be referred to as the "object" and the relationship may also be referred to as the "predicate" or "relation".

Each neuron in a set of neurons 121, 122, 123 may provide an output value in the range 0 to 1 that represents the probability that the object represented by that neuron is the correct output. For example, neurons in set 121 may respectively output the probability that the first object 11 is a man, a horse, a cat, and so on. The sum of the probabilities in a set may be 1, so that probabilities in each set form a probability distribution. The output layer 120 may for example use the softmax activation function to provide the probability distribution. Accordingly, the system 100 may provide as output the label corresponding to the neuron with the highest value. The probabilities may also be referred to herein as "confidences" or "confidence scores", in that they represent the confidence the model 110 has in the predicted label.

The system also includes at least one processor 101 and a memory 102 coupled to the processor 101. The at least one processor 101 may comprise one or more of: a microprocessor, a microcontroller, and an integrated circuit. The memory 102 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The system 100 may include or be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example systems.

Figure 2:
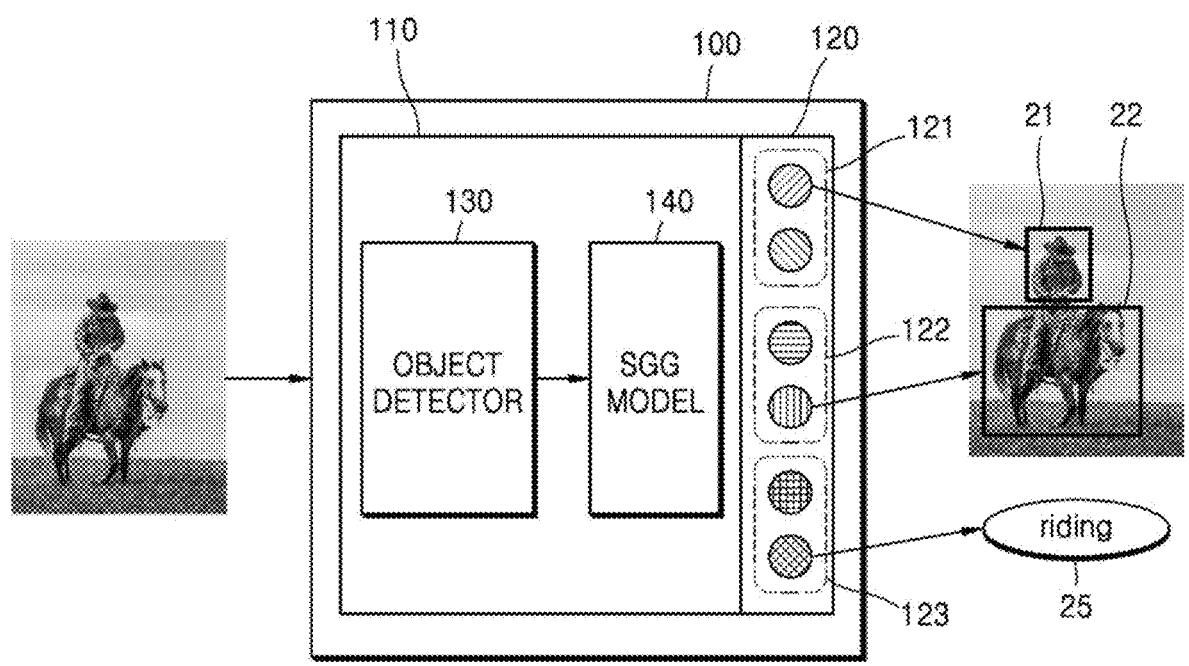
FIG. 2 is a schematic diagram of the example system of FIG. 1 in more detail.

FIG. 2 illustrates the system 100 in more detail. As can be seen in FIG. 2, the machine learning model 110 may comprise an object detector 130 and an SGG model 140.

The object detector 130 receives the image 10 as input and detects the objects therein. Optionally, the object detector 130 may also output labels for the detected objects. It will be appreciated that object detection is a well-known computer vision task. Accordingly, any known object detection technique may be employed for the object detector 130. For example, the object detection technique may be the technique described in "*Faster R-CNN: towards real-time object detection with region proposal networks*", Ren et al, NeurIPS 2015. In another example, the object detection technique may be the technique described in "*You Only Look Once: Unified, Real-Time Object Detection*", Redmon et al, CVPR 2016. The disclosure of these documents in incorporated herein by reference in its entirety.

The SGG model 140 may receive the output of the object detector 130 and output subjects, objects and relations. The SGG model 140 may be based on any suitable SGG technique, further trained as discussed herein. Example SGG models suitable as a basis for the SGG model 140 include those described in the following publications, each of which is incorporated herein by reference in its entirety: "*Scene graph generation by iterative message passing*", Xu et al., CVPR 2017; "*Neural-motifs: Scene graph parsing with global context*", Zellers et al., CVPR 2018; "*Learning to compose dynamic tree structures for visual contexts*", Tang et al., CVPR 2019; "*Unbiased Scene Graph Generation from Biased Training*", Tang et al., The output layer 120 forms part of the SGG model 140.

Figure 3:
FIG. 3 is a schematic diagram illustrating generation of a scene graph by the system of FIGS. 1 and 2.
Figure 3:
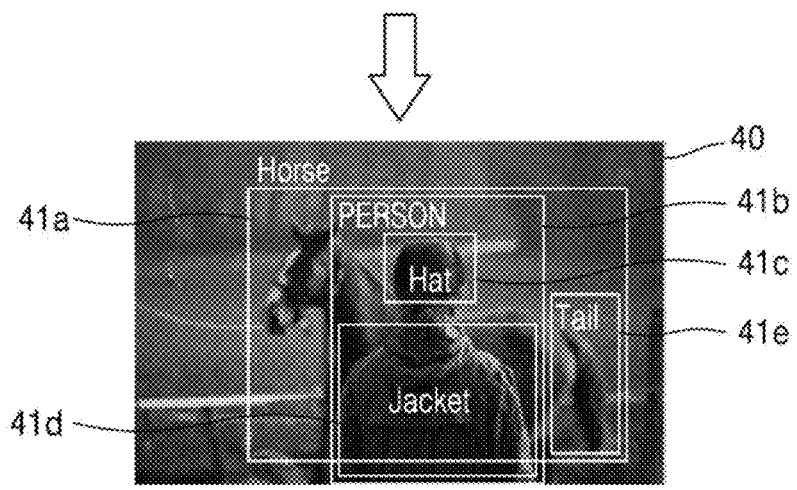
Figure 3:
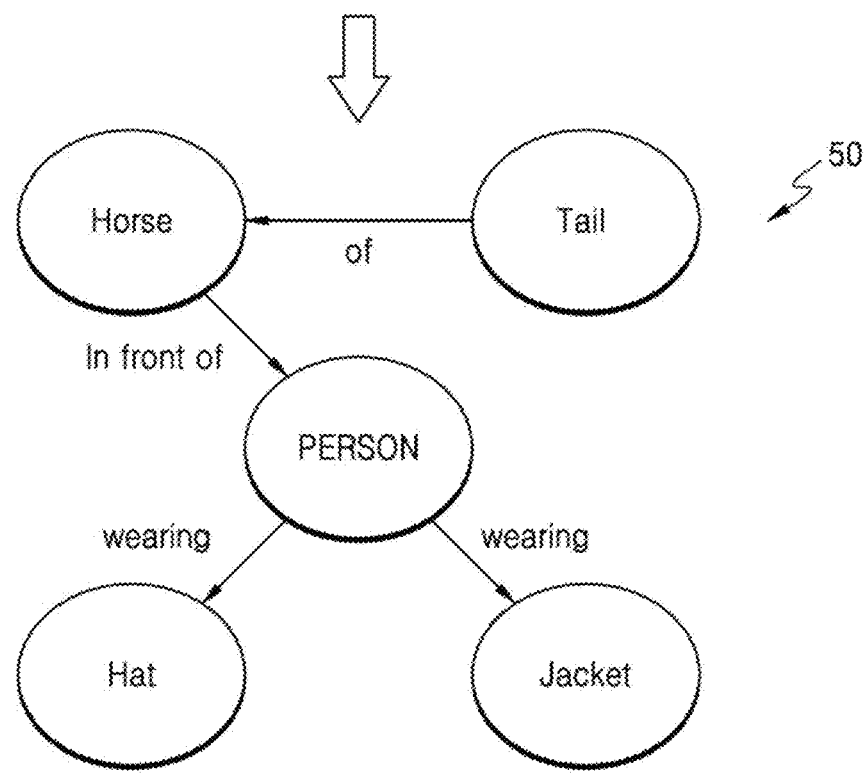

FIG. 3 illustrates the generation of the scene graph by the system 100 in more detail. Particularly, FIG. 3 shows an input image 30, containing several objects. FIG. 3 also shows an image 40, which illustrates the output of the object detector 130. The image 40 has been labelled with bounding boxes 41 representing objects identified in the image 40, particularly identifying a horse 41a, a person 41b, a hat 41c, a jacket 41d and a tail 41e. FIG. 3 furthermore shows a scene graph 50, generated by the SGG model 140. The scene graph 50 illustrates the relationships between the identified objects 41a-e. Particularly, the scene graph 50 illustrates that the tail is of the horse, the person is in front of the horse, and the person is wearing a hat and wearing a jacket.

Figure 4:
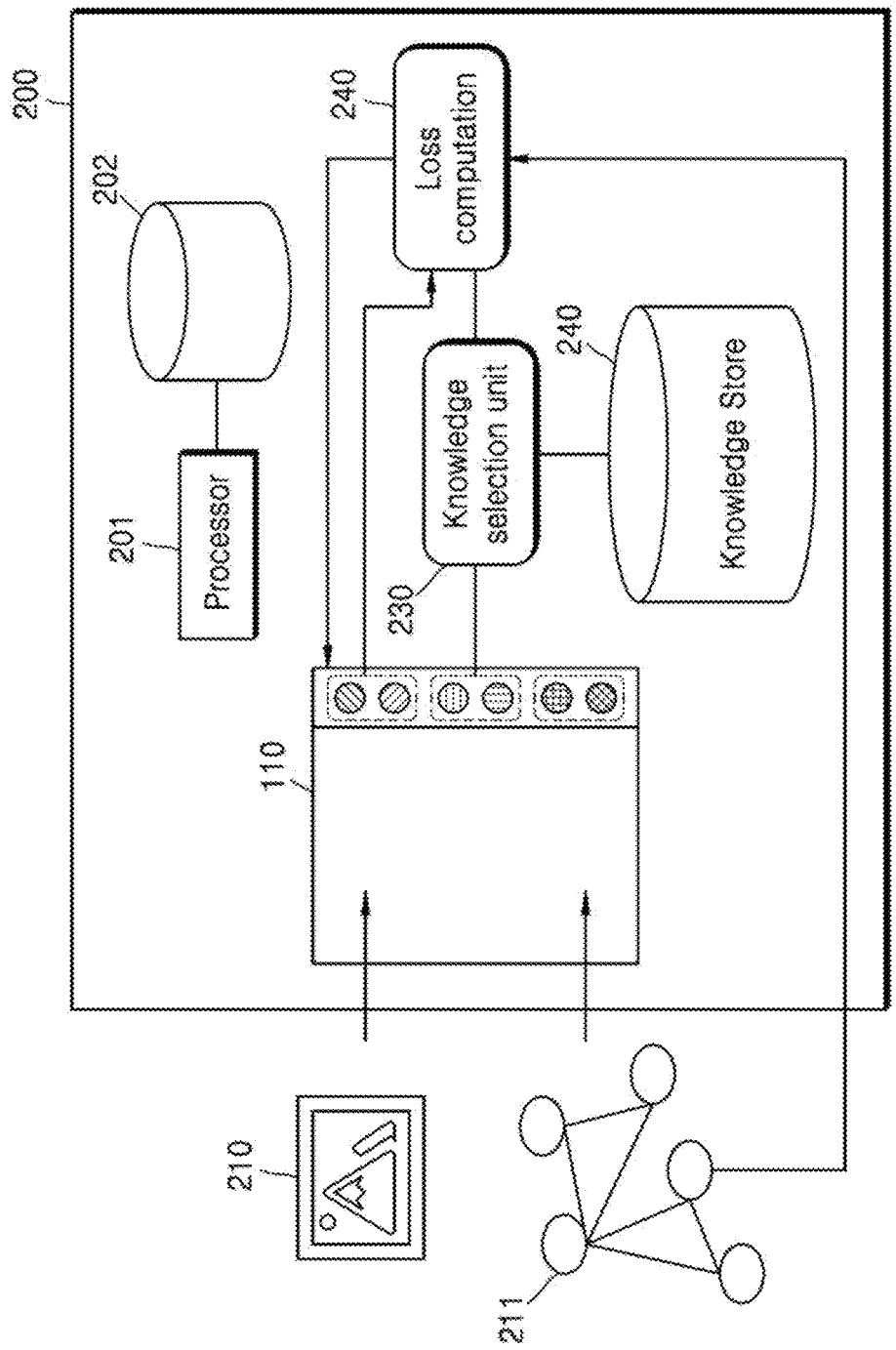
FIG. 4 is a schematic diagram of an example system for training a machine learning model for scene graph generation.

FIG. 4 schematically illustrates a system 200 for training the machine learning model 110, and in particular the SGG model 140. The system 200 includes the machine learning model 110, a background knowledge store 220 and a loss computation module 240.

The system 200 also includes at least one processor 201 and a memory 202 coupled to the processor 201. The at least one processor 201 may comprise one or more of: a microprocessor, a microcontroller, and an integrated circuit. The memory 202 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example. Although shown separately on FIG. 4, the memory 202 may store the background knowledge store 220. The system 200 may for example be or include a server computer.

In common with widely known and well-established techniques for training machine learning models 110 including neural network layers, the system 200 receives labelled input data, represented by input image 210 and label 211, which is processed by the model 110. The error of the output prediction of model 110 is calculated using a loss function, in this case represented by loss computation module 240. The output of the loss function is then fed back to the model 110, for example using backpropagation, adjusting the weights thereof. This process iterates until a relevant termination condition is reached, such as an acceptable error value being reached or completion of a threshold number of iterations.

The system 200 differs from existing training techniques by the calculation of the loss function by the loss computation module 240. Particularly, the loss computation module 240 takes into account both supervised loss, which is calculated by comparing the output prediction of the model 110 to the input labels, and logic-based loss, which is calculated by evaluating the output of the model 110 against the knowledge in the background knowledge store 220. The computation of the loss by the loss computation module 240 will be discussed in detail below.

In more detail, the system 200 receives a plurality of labelled training images 210 as input, wherein the label for each training image 210 takes the form of a scene graph 211. In some examples, the scene graph 211 may instead be replaced by a list of relations, for example in the form (subject, object, predicate).

The background knowledge store 220 stores a plurality of rules, which encode common sense or background knowledge. A number of common sense knowledge bases exist, including ConceptNet (Robyn Speer, Joshua Chin, and Catherine Havasi, "*Conceptnet 5.5: An open multilingual graph general knowledge*", In AAAI, pages 4444-4451, 2017) and ATOMIC (Maarten Sap, Ronan Le Bras, Emily Allaway, Chandra Bhagavatula, Nicholas Lourie, Hannah Rashkin, Brendan Roof, Noah A. Smith, and Yejin Choi, "*ATOMIC: an atlas of machine commonsense for if-then reasoning*", In AAAI, pages 3027-3035, 2019). The rules in the background knowledge store 220 may comprise all or a subset of the rules from one or more knowledge bases.

Particularly, the rules in the background knowledge store 220 comprise integrity constraints (ICs), which express permissible and/or impermissible relationships between objects. A number of example ICs are shown in the table below, both in plain text form and in logical representation:

| Text rule | Logical representation |
| --- | --- |
| A man can wear a jacket | wear(man, jacket) |
| A man cannot eat a jacket | ¬eat(man, jacket) |
| A painting can be on a wall | on(painting, wall) |
| A painting cannot ride a wall | ¬ride(painting, wall) |
| An orange can hang from a tree | hang(orange, tree) |
| An orange cannot be made of a tree | ¬made of(orange, tree) |
| A horse cannot drink an eye | ¬drink(horse, eye) |

In one example, the background knowledge store 220 may be populated by identifying subject-object pairs in background knowledge bases that have a limited number of possible relations. For example, the subject-object pair "person-fruit" may only have a small number of possible relationships that link the subject and object, such as "eat" or "hold". These relationships form particularly useful ICs, on the basis that relationships beyond the limited number in the knowledge base are likely to be incorrect. In one example, the background knowledge store 220 may comprise approximately 500,000 rules.

As noted above, the loss computation module 240 computes the loss based on both supervised loss and logic-based loss. Accordingly, the loss function may take the following form:

$$\theta^* := \underset{\theta}{\operatorname{argmin}} \beta_1 \cdot \sum_{i=1}^{m} \mathcal{L}^n(\mathcal{F}^i, w_\theta^i) + \beta_2 \cdot \sum_{i=1}^{m} \mathcal{L}^s(T, w_\theta^i) \quad (1)$$

In equation (1) above, the term $\Sigma_{i=1}^{m} \mathcal{L}^n (\mathcal{F}^i, w_\theta^i)$ represents the supervised loss and the term $\Sigma_{i=1}^{m} \mathcal{L}^s (T, w_\theta^i)$ represents the logic-based loss.

$\beta_1$ and $\beta_2$ are hyperparameters that control the importance of each of the two components of the loss. The hyperparameters may be computed automatically, for example as set out in Kendall, Alex, Yarin Gal, and Roberto Cipolla. "*Multi-task learning using uncertainty to weigh losses for scene geometry and semantics.*" *Proceedings of the IEEE conference on computer vision and pattern recognition.* 2018, the contents of which are incorporated herein by reference. In other examples, the relative weighting of the supervised loss and logic-based loss may be predetermined. For example, the losses may be weighted equally.

In the equation (1) above, i represents an input image, 4 are the predictions of the model 110, $\mathcal{F}^i$ are the labels of the input image, and T represents the ICs in the background knowledge store 220.

$\mathcal{L}^n$ may comprise any suitable supervised loss function for neural networks. For example, it may include cross entropy loss, mean squared error, mean absolute error, exponential loss or any other function that can be applied to determine the loss.

In terms of $\mathcal{L}^s$, the logic-based loss is inversely proportional to a function SAT: $(\varphi, w_\theta) \rightarrow R^+$, where $\varphi$ is an IC drawn from T. For example, if $\varphi$=¬drink(horse, eye), SAT will decrease as drinks(horse, eye) becomes closer to true. Therefore, the logic-based loss penalises predictions of the neural network 110 that violate the ICs in the background knowledge store 220.

In equation (1) above, the term $\mathcal{L}^s (T, w_\theta^i)$ acts as a shorthand for the following:

$$\mathcal{L}^s \left( \bigwedge_{\varphi \in T} \varphi, w \right)$$

In other words, to obtain the logic-based loss in respect of the entirety of T, the conjunction is taken of the loss calculated for each rule in T.

It is envisaged that the $\mathcal{L}^s$ may be calculated in any of a number of ways. In one example, $\mathcal{L}^s$ complies with the following properties:

$\mathcal{L}^s (\varphi, w_\theta)$ is differential almost everywhere.

$\mathcal{L}^s(\varphi, w_\theta) = 0$ if $w_\theta \models \varphi$ $\mathcal{L}^s(\varphi, w_\theta) \leq \mathcal{L}^s(\varphi', w_\theta)$, if $SAT(\varphi, w_\theta) \geq SAT(\varphi', w_\theta)$ $\mathcal{L}^s CS(\varphi, w_\theta) = \mathcal{L}^s(\varphi', w_\theta)$, if $\varphi$ is logically equivalent to $\varphi'$ Two example techniques for calculating the logic-based loss will now be discussed.

In a first example technique, fuzzy logic is employed to calculate the logic-based loss. In one example, the fuzzy loss DL2 is employed. DL2 is discussed in Marc Fischer, Mislav Balunovic, Dana Drachsler-Cohen, Timon Gehr, Ce Zhang, and Martin T Vechev. "*DL2: training and querying neural networks with logic.*" In ICML, volume 97, pages 1931-1941, 2019., the contents of which are incorporated herein by reference.

DL2 includes the following definitions:

$$\mathcal{L}^s(t,w):=1-w(t)$$

$$\mathcal{L}^s(\neg t,w):=w(t)$$

$$\mathcal{L}^s(\varphi_1 \wedge \varphi_1, w) := \mathcal{L}^s(\varphi_1, w) + \mathcal{L}^s(\varphi_2, w)$$

$$\mathcal{L}^s(\varphi_1 \vee \varphi_1, w) := \mathcal{L}^s(\varphi_1, w) + \mathcal{L}^s(\varphi_2, w)$$

$$\mathcal{L}^s(\neg\varphi, w) := \mathcal{L}^s(\psi, w)$$

In the above, t is a variable $\varphi$, $\varphi_2$ and $\varphi_3$ are formulas over variables, $\wedge$, $\vee$ and $\neg$ are the Boolean connectives, and $\psi$ is the formula that results after applying the De Morgan's rule to $\neg\varphi$ until each negation operate is applied on the level of single variables.

Accordingly, the example negative rule ¬drink(horse, eye) becomes w(drink)·w(horse)·w(eye). An example positive rule wear(man, jacket) becomes 1−(w(wear)·w(man)·w (jacket)). As noted above, w is the output of the machine learning model 110 in respect of the given label. Accordingly, w(wear)=0.7 would represent an example in which the machine learning model has predicts there is a 0.7 probability of relationship being "wear".

In a second example technique, probabilistic logic is employed to calculate the logic-based loss. In contrast to fuzzy logic, in probabilistic logic all interpretations of a formula are reasoned over. Particularly, each variable in a formula can be assigned a value corresponding to true (i.e. the value obtained from the machine learning model 110) or false (i.e. 1−the value obtained from the machine learning model 110). An interpretation of the formula is one permutation of the assignments of values to the variables in the formula. Accordingly, in probabilistic logic, each possible permutation of values for the variables is considered.

In one example, Weighted Model Counting is used to reason over the possible interpretations. Weighted Model Counting is discussed in Chavira, Mark and Adnan Darwiche. "*On probabilistic inference by weighted model counting.*" Artif. Intell. 172 (2008): 772-799, the contents of which are incorporated herein by reference.

More formally, an interpretation I of a propositional formula $\varphi$ is an assignment of its variables to true (T) or false ($\perp$). $\mathcal{J}(\varphi)$ is the set of all interpretations of formula $\varphi$ and I(t) is the value of variable t in an interpretation I. Interpretation I is a model of $\varphi$, denoted as $I \models \varphi$, if $\varphi$ evaluates to true under I. The weight W(I,w) of I under w is defined as follows: if I is not a model of $\varphi$ then it is zero; otherwise it is given by:

$$\prod_{t \in \varphi | I(t)=T} w(t) \cdot \prod_{t \in \varphi | I(t)=\perp} 1-w(t)$$

Where $t \in \varphi$ denotes that variable t occurs in formula $\varphi$. WMC is then calculated as the sum of the weights of all models of $\varphi$ under w:

$$\sum_{I \in \mathcal{J}(\varphi) | I \models \varphi} W(I, w)$$

FIG. 5 illustrates the possible interpretations of the IC ¬drink(horse, eye), which are summed according to the above formula.

The WMC provides a measure of satisfiability of the IC. However, to define the loss function a measure is required that effectively defines the distance to satisfiability. Accordingly, in one example, the logic-based loss function is defined as follows:

$$L^s(\varphi,w)=-\log WMC(\varphi,w)$$

Returning now to FIG. 4, in one example the system 200 comprises a knowledge selection unit 220. The background knowledge store 220 may contain in the order of hundreds of thousands of rules. Accordingly, it may be computationally inefficient to evaluate the logic-based loss in respect of very large numbers of rules. Therefore, the knowledge selection unit 230 is configured to select a subset of the rules in the background knowledge store 220 for use by the loss computation module 240.

In one example, the knowledge selection unit 230 is configured to select a subset of the rules in the knowledge store 220 that are maximally non-satisfied. In other words, the knowledge selection unit 230 selects rules that are maximally violated by the current prediction of the model 110 in respect of the current training image, to use as feedback to the machine learning model 110.

This may improve the chances of providing meaningful feedback to the machine learning model 110, on the basis that predictions of the machine learning model 110 that do not satisfy ICs (i.e. have a low value for SAT) are highly likely to be incorrect and in need of amendment. On the other hand, predictions that satisfy an IC may not necessarily be correct, and instead it could be the case that the predictions relate to a permissible relationship between a subject and object, but not the one present in the training image.

In one example, the subset of rules may be selected by the following procedure.

Firstly, the N output predictions of the machine learning model 110 with the highest confidences are obtained. N is a hyperparameter of the training method. The list of N output predictions are ordered by decreasing confidence.

Next, any prediction predicate(subject, object) for which there is no corresponding negative IC ¬predicate(subject object) in the background knowledge store 220 is removed from the list. This effectively removes any high-confidence predictions that do not violate a negative IC from consideration. Accordingly, at this stage the list contains only predictions that violate a negative IC.

Next, random subsets of the list are selected of size p. In one example, p is 10, though in other examples it may take different values, for example 2, 3, 5, or 7. In one example, 30 or under random subsets are selected from the list. In other examples, 20 or under, or 10 or under random subsets will be selected. It will be appreciated that the number may be varied.

The loss $\mathcal{L}^s$ is then calculated for each of the subsets. The maximum loss is then taken as the actual logic-based loss.

Figure 6:
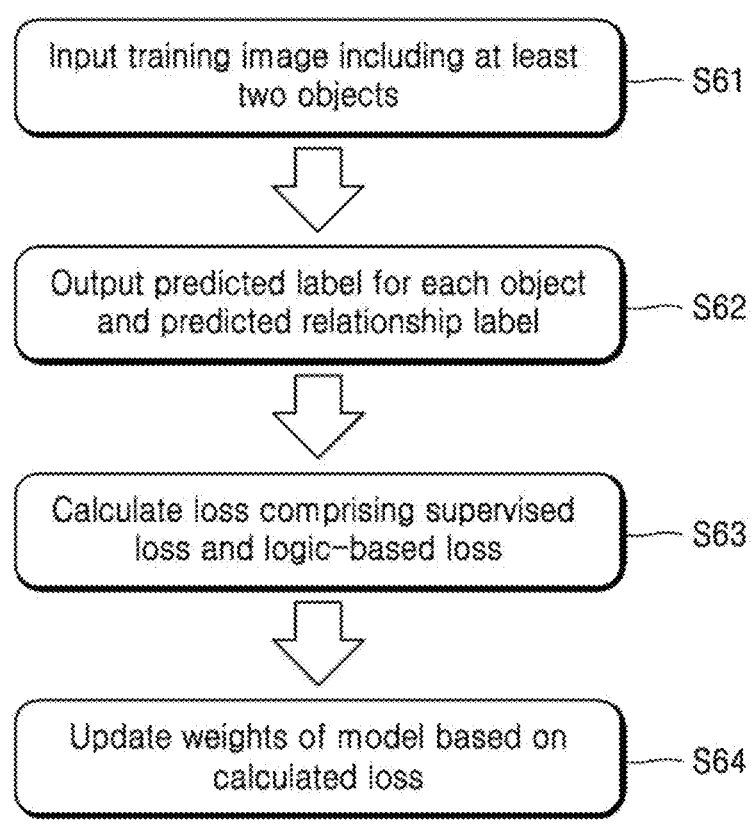
FIG. 6 is a schematic flowchart of an example method of training a machine learning model for scene graph generation.

FIG. 6 is a schematic flowchart showing an example method of training a machine learning model.

The method comprises a step S61 of inputting the training image into a machine learning model, for example machine learning model 110 discussed herein. The training image depicts a scene comprising at least two objects.

The method further comprises a step S62 of outputting, from the machine learning model, a predicted label for the each of the at least two objects and a predicted label for a relationship between the at least two objects.

Next, in step S63, a loss is calculated using a loss function. Calculating the loss comprises calculating a supervised loss by comparing the predicted label for the each of the at least two objects and the predicted label for a relationship between the at least two objects to actual labels corresponding to the training image. Calculating the loss also comprises calculating a logic-based loss by comparing the predicted label for the each of the at least two objects and the predicted label for a relationship between the at least two objects to a plurality of stored integrity constraints, wherein the integrity constraints comprise common-sense knowledge.

Subsequently, in step S64, weights of the machine learning model are updated based on the calculated loss.

The example method is iterated to train the machine learning model. The method may iterate until a termination condition is met. The example method of FIG. 6 may include further steps, for example any of the steps discussed herein in relation to system 200.

Figure 7:
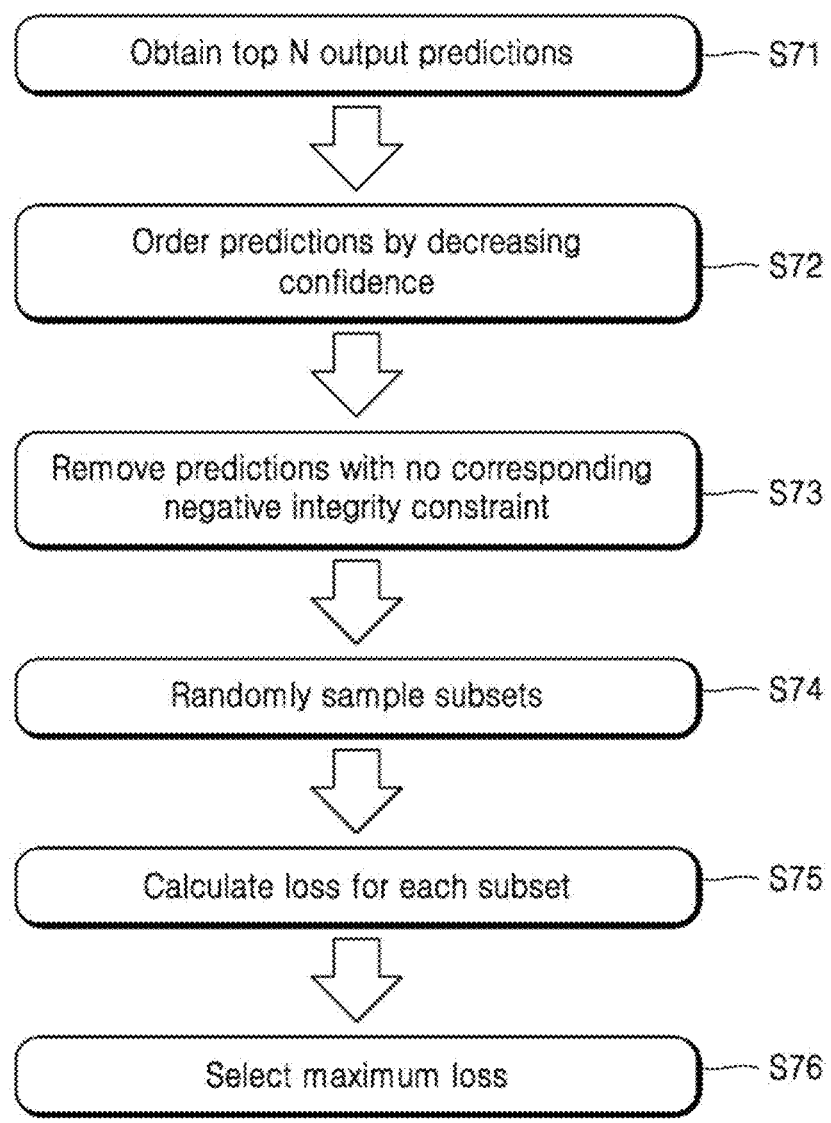
FIG. 7 is a schematic flowchart of an example method of training a machine learning model for scene graph generation in more detail.

FIG. 7 is a schematic flowchart showing an example method of calculating the loss function, and particularly the logic-based loss. Accordingly, the steps of FIG. 7 may form part of step S63 of FIG. 6.

In a first step S71, the N output predictions of the machine learning model with the highest confidences are obtained. In a second step S72, the list of N output predictions are ordered by decreasing confidence. Next, in step S73, any prediction for which there is no corresponding negative IC in the background knowledge store is removed. Next, in step S74, random subsets of the list are selected. Next, in step S75, the loss is calculated for each of the subsets. Subsequently, in step S76, the maximum loss is selected the logic-based loss.

FIGS. 8A-G illustrate the performance of the model 110 trained as described herein.

In the experiments represented in FIGS. 8A-G, the model is trained on the Visual Genome (VG) dataset ("*Visual Genome: Connecting Language and Vision Using Crowdsourced Dense Image Annotations*", Ranjay Krishna, Yuke Zhu, Oliver Groth, Justin Johnson, Kenji Hata, Joshua Kravitz, Stephanie Chen, Yannis Kalantidis, Li Jia-Li, David Ayman Shamma, Michael Bernstein, Li Fei-Fei, publicly available at http://visualgenome.org/), which comprises 108,000 images having 150 subject/object classes and 50 relationship classes.

In the experiments represented in FIGS. 8A-G, some embodiments of the disclosure are used with the following SGG models: IMP (*Scene graph generation by iterative message passing*, Xu et al., CVPR 2017), Motifs (*Neural-motifs: Scene graph parsing with global context*, Zellers et al., CVPR 2018) and VCTree (*Learning to compose dynamic tree structures for visual contexts*, Tang et al., CVPR 2019). In addition, some embodiments of the disclosure are compared in FIG. 8G to the GLAT system (*Learning Visual Commonsense for Robust Scene Graph Generation*, Zareian et al., ECCV 2020). In some of the experiments, the model 110 is also regularised at inference time using the Total Direct Effect (TDE) method set out in *Unbiased Scene Graph Generation from Biased Training*, Tang et al., CVPR 2020. Furthermore, experiments using both probabilistic logic (WMC) and fuzzy logic (DL2) are presented. In FIG. 8A-G "TTR" refers to training-time regularisation in line with some embodiments of the disclosure.

Results are presented for predicate classification and SGG classification. The predicate classification task is defined as follows: given an input image I, a pair of a subject and an object (s, o) and the coordinates of the bounding boxes that enclose s and o, predict the relationship r between s and o. The scene graph classification task conceals the pair (s, o) and asks the model to return the fact r(s, o).

The metrics shown in FIGS. 8A-G are Mean Recall @ K (mR@K) and zero-shot Recall @ K (zsR@K). mR@K is computed by grouping the ground truth facts based on their predicates, then computing for each such group the percentage of the facts that were retrieved by the model, restricting to its k most confident predictions, and, finally, taking the average percentages over all groups. zsR@K measures the performance of a model considering only the facts that are present in the testing set but not in the training one, quantifying the ability of a model to generalize outside the training data.

Figure 8C:
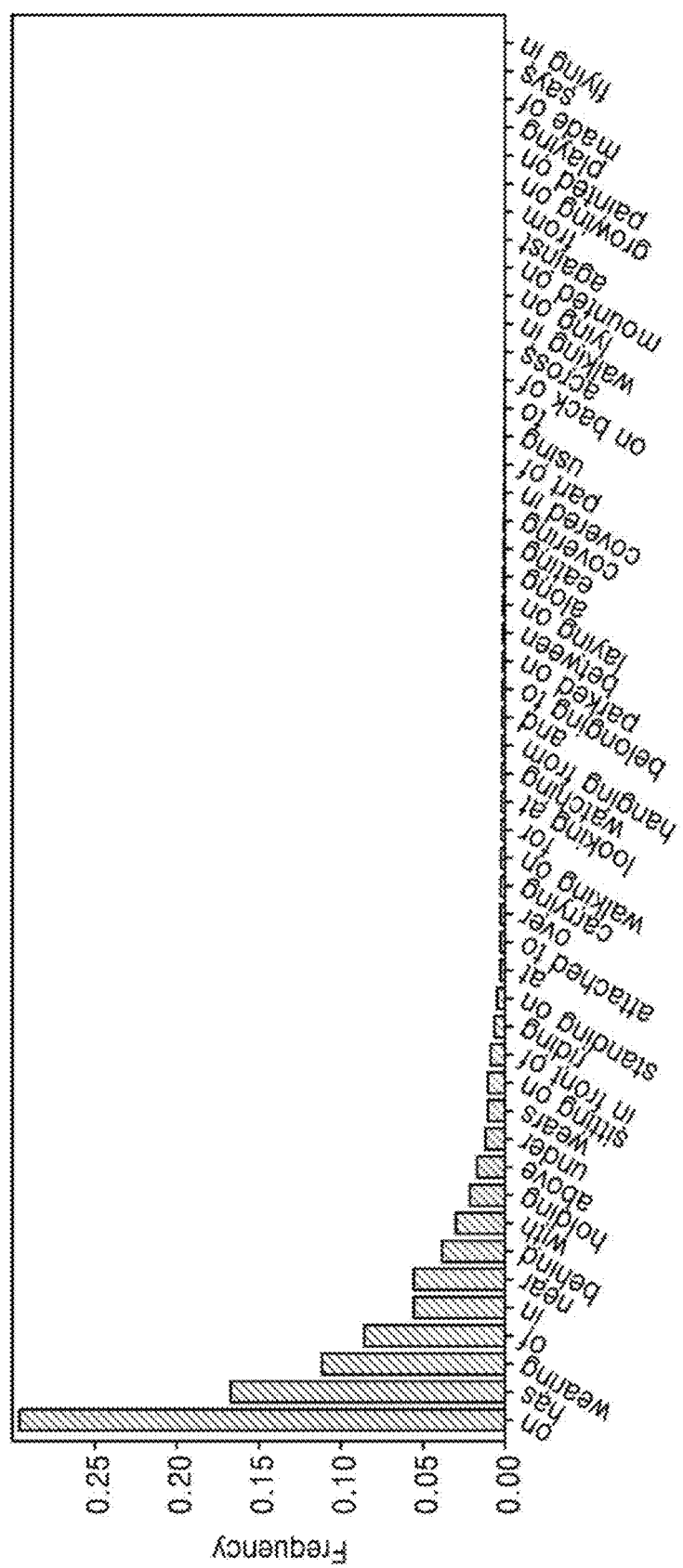
FIG. 8C is a graph illustrating the distribution of relations in the Visual Genome dataset.

Taking FIGS. 8A-G in turn, FIG. 8A illustrates the performance of an embodiment of the disclosure in comparison to the same models trained without TTR. Improvement is shown consistently by TTR(WMC) regardless of the model. Improvement is often shown by TTR(DL2), though this varies dependent on the model.

FIG. 8B illustrates the combination of TDE and TTR, the combination of which results in substantial improvements of up to 88%.

Figure 8D:
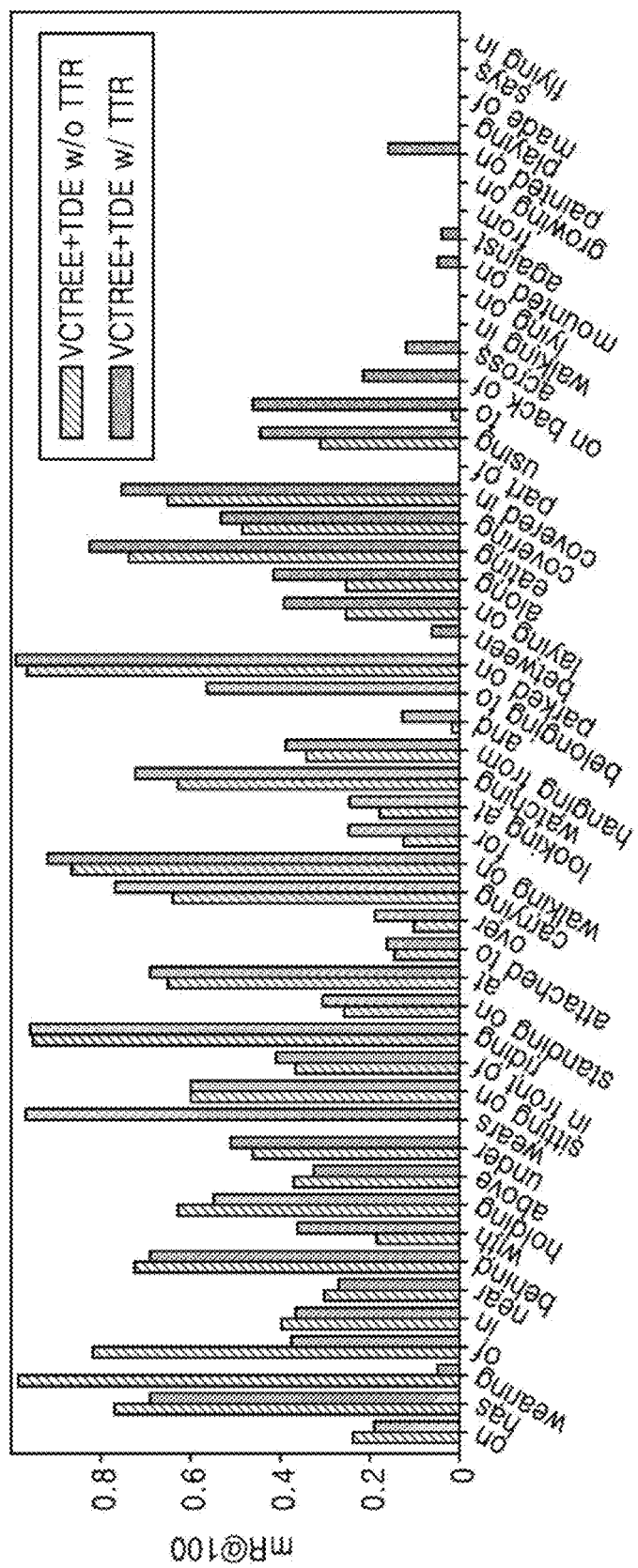
FIG. 8D is a graph illustrating the performance of an embodiment of the disclosure across the relations in the Visual Genome dataset.

FIG. 8C illustrates the distribution of relationships in the VG dataset. FIG. 8D illustrates that an embodiment of the disclosure bring substantial improvements in relation to less frequent relationships.

FIG. 8E illustrates the impact on runtime and performance of changing the size of the subsets randomly drawn in step S74 above. Increasing the size of the subsets causing a corresponding linear increase in training runtime. Furthermore, it appears that there is a trade-off between mR@K and zsR@K, with larger sized subsets improving mR@K but smaller sized subsets improving the performance on unseen data represented by zsR@K.

FIG. 8F compares the performance of an embodiment of the disclosure with a baseline inference-time regularisation (ITR) technique. In the ITR technique, the outputs of the machine learning model are ordered by confidence, and prediction violating a rule in T (i.e. the knowledge base) are removed. The improvements provided by TTR are greater than those provided by ITR.

FIG. 8G compares the performance of an embodiment of the disclosure with a state-of-the-art technique (GLAT) that uses exclusively neural network-based training without employing logic. An embodiment of the disclosure perform significantly better.

Figure 9:
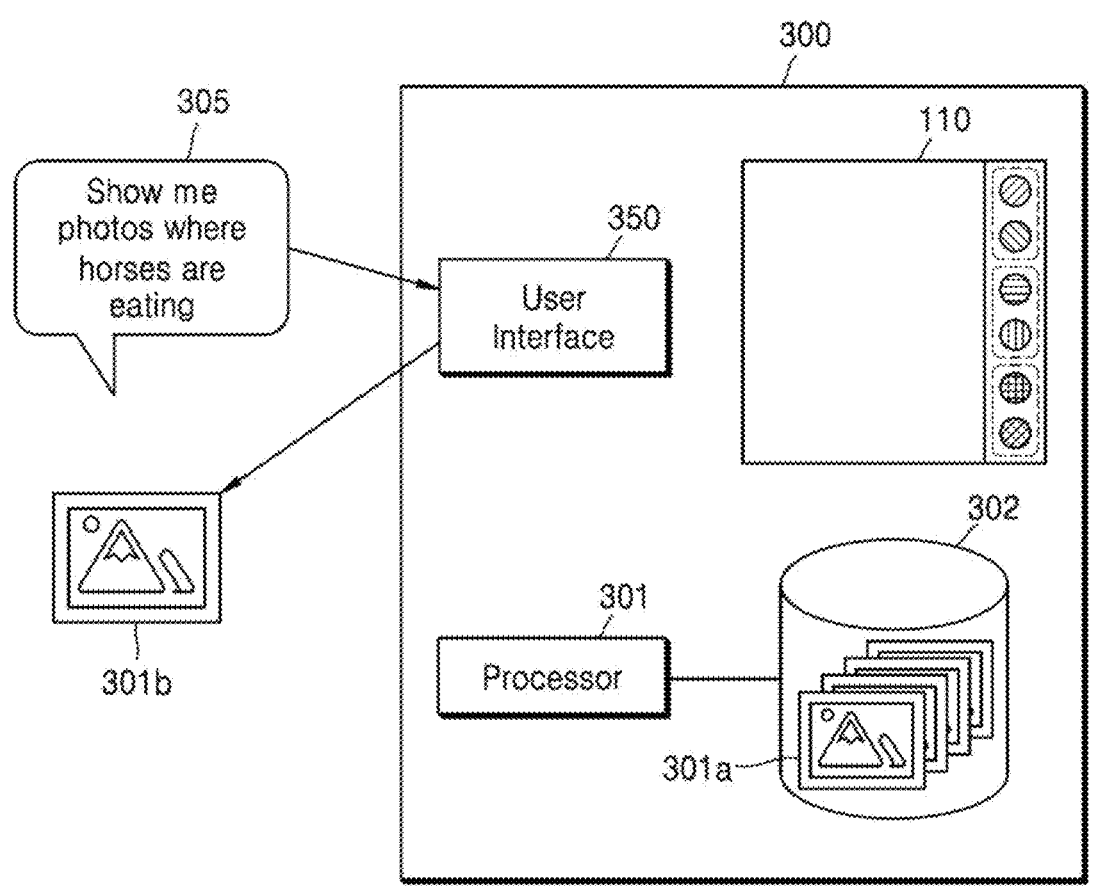
FIG. 9 is a schematic diagram of an example system for image search.

FIG. 9 illustrates an example system 300 for image search. The system 300 has features corresponding to system 100 described above, with corresponding features incremented by 200 from those shown in FIG. 1. The description of these corresponding elements will not be repeated.

The system 300 comprises a user interface 350. The user interface 350 may take the form of any suitable means of receiving user input, including but not limited to a touch screen display, a mouse and/or keyboard, and a microphone, which may be associated with suitable speech-to-text conversion software.

The memory 301 of the system 300 stores a plurality of images 301a. For example, the plurality of images 301a may be images captured via an image capture unit (not shown) of the system. Accordingly, the plurality of images 301a may be an image gallery, for example as commonly found on a smartphone or tablet.

The system 300 is configured to receive a user image query 305 via the user interface 350. The query may comprise at least a label of an object in an image to be retrieved and a label of a relationship involving the object. For example, a query may include a subject and a relationship, such as "show me an image of a horse eating". In another example, the query may include a relationship and object, such as "show me images of things on a table". The image query may also include all three of a subject, object and relation.

The system 300 is further configured to retrieve one or more images of the images 301a matching the query. Particularly, the system 300 may generate scene graphs corresponding to the images 301a. The system 300 may then return an image 301b that includes the queried object and relationship in its scene graph. The returned image 301b may be displayed via the user interface 350.

It will be appreciated that in some examples the scene graphs of the images are generated in response to the query, but in other examples the scene graphs are generated in advance (e.g. shortly after capture of each image) and stored in the memory 301.

In another example, the stored images 301a may be frames of a video, including for example television programmes or films. Accordingly, the system 300 may be used to search for scenes in a video in which objects are performing a particular action.

Figure 10:
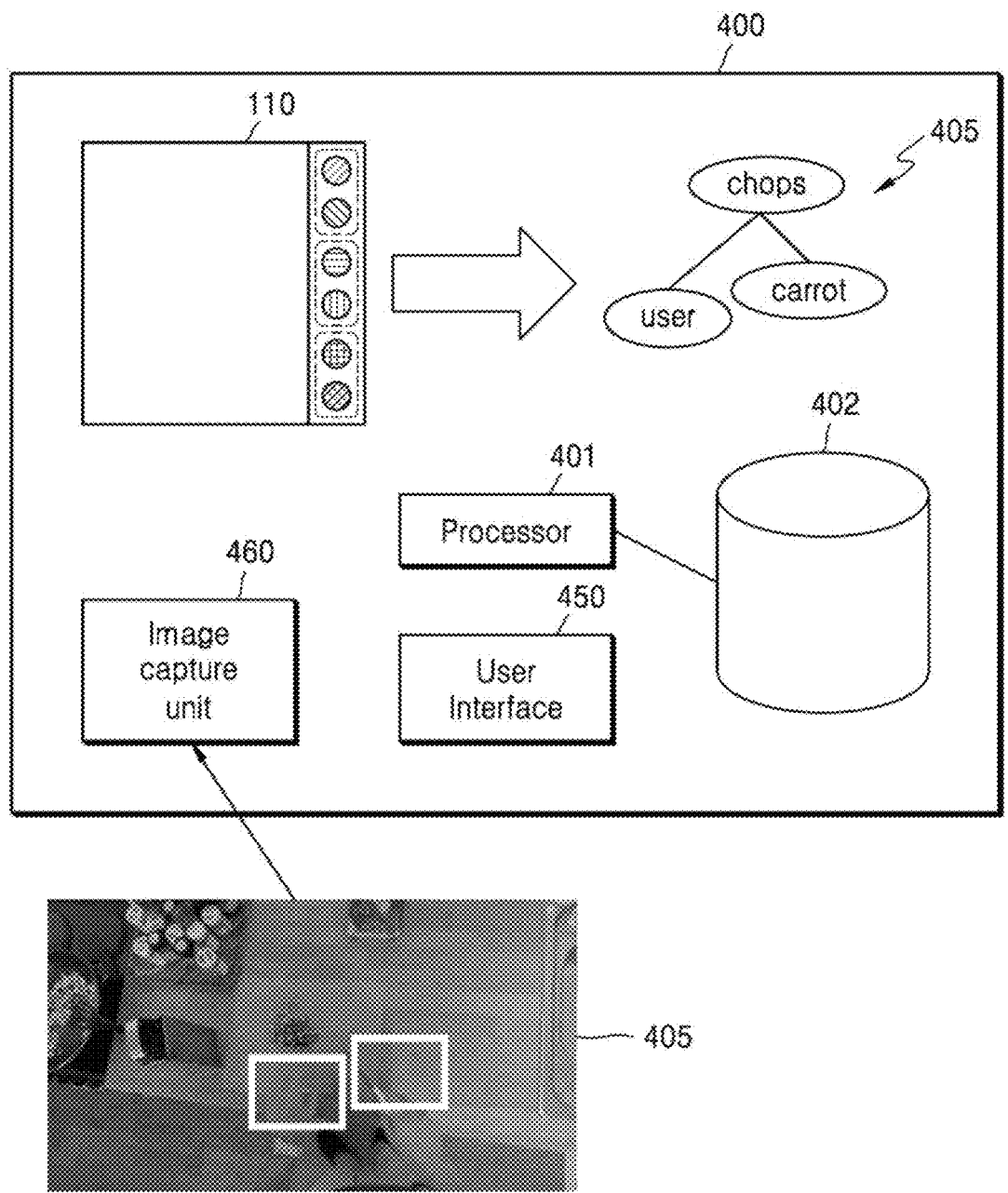
FIG. 10 is a schematic diagram of an example personal assistant system.

FIG. 10 illustrates an example personal assistant system 400. The system 400 has features corresponding to system 100 described above, with corresponding features incremented by 300 from those shown in FIG. 1. The description of these corresponding elements will not be repeated.

The system 400 includes a user interface 450 and an image capture unit 460. The user interface 350 may take the form of any suitable means of receiving user input, including but not limited to a touch screen display, a mouse and/or keyboard, and a microphone, which may be associated with suitable speech-to-text conversion software.

The image capture unit 460 may comprise one or more cameras. The image capture unit 460 may comprise cameras integral with the other components of the system 400 (i.e. built into a smartphone or tablet), though in other examples the image capture unit 460 may comprise cameras disposed remote from the other components of the system 400.

The personal assistant system 400 is configured to capture images using the image capture unit 460 of a user performing an activity. In the example shown in FIG. 10, the personal assistant system 400 captures an image 405 of a user preparing a meal, and thus may be a kitchen assistant.

The personal assistant system 400 is further configured to generate a scene graph 406 based on the captured image 405 of the user performing the activity. For example, in FIG. 10, the scene graph 406 identifies that the user is chopping a carrot in image 405.

The personal assistant system 400 may be further configured to determine whether the user is performing the activity correctly. For example, the memory 402 may store a list of permitted actions associated with the activity. The system 400 may then determine whether the user is performing one of the permitted actions stored in the memory, based on the scene graph 406. In some examples, the permitted actions may be ordered—for example in the case of sequential steps in a recipe. Accordingly, the system 400 may be configured to determine whether the action performed by the user in the captured image 405 is being performed at the correct time or in the correct sequence.

The personal assistant system 400 may be configured to alert the user in the event that the activity is not being performed correctly, for example via user interface 450.

It will be appreciated that the personal assistant system 400 is not limited to being a kitchen assistant system. In other example, the personal assistant system 400 may guide the user in other tasks, such as exercise routines, repair or maintenance tasks, and the like.

Figure 11:
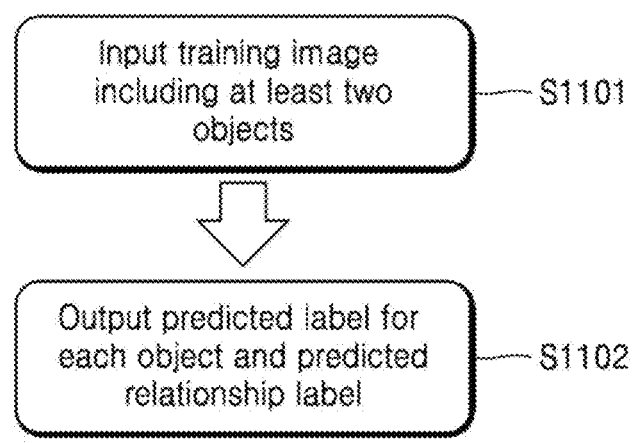
FIG. 11 is a schematic flowchart of an example method of generating a scene graph.

FIG. 11 illustrates an example method of an embodiment of the disclosure, which may for example be carried out by systems 100, 300 or 400. The method comprises a first step S1101 of receiving an input image, and second step S1102 of generating a scene graph using a machine learning model trained according to an embodiment of the disclosure.

Advantageously, an embodiment of the disclosure provide a method of augmenting the training of a machine learning model for SGG using common sense knowledge. An embodiment of the disclosure advantageously operate at training time, and thus do not increase the computation required at inference time. An embodiment of the disclosure are furthermore applicable to any existing SGG model, which may be further trained according to the disclosed techniques. In addition, an embodiment of the disclosure can efficiently leverage the knowledge stored in very large knowledge stores, by selecting integrity constraints from the store that are maximally non-satisfied. The SGG models may be employed in applications including image search and smart assistants.

Those skilled in the art will appreciate that while the foregoing has described what is considered to be the best mode and where appropriate other modes of performing some embodiments of the disclosure, the some embodiments of the disclosure should not be limited to the specific configurations and methods disclosed in this description of the preferred embodiment. Those skilled in the art will recognise that some embodiments of the disclosure have a broad range of applications, and that the embodiments may take a wide range of modifications without departing from any inventive concept as defined in the appended claims.

The invention claimed is:

1. A computer-implemented method for training a machine learning model comprising a plurality of neural network layers for scene graph generation, SGG, comprising:
  inputting a training image into the machine learning model, the training image depicting a scene comprising at least two objects;
  obtaining, from the machine learning model, a predicted label for the each of the at least two objects and a predicted label for a relationship between the at least two objects;
  determining a loss; and
  updating, based on the determined loss, weights for the plurality of neural network layers of the machine learning model,
  wherein the determining the loss comprises:
    determining a supervised loss by comparing the predicted label for the each of the at least two objects and the predicted label for the relationship between the at least two objects to actual labels corresponding to the training image; and
    determining a logic-based loss by comparing the predicted label for the each of the at least two objects and the predicted label for the relationship between the at least two objects to a plurality of stored integrity constraints, wherein the integrity constraints comprise positive integrity constraints expressing permissible relationships between objects, and negative integrity constraints expressing impermissible relationships between objects, and wherein the determining the logic-based loss comprises:
  selecting a maximally non-satisfied subset of the plurality of stored integrity constraints, and
  determining the logic-based loss based on the maximally non-satisfied subset, and wherein the selecting the maximally non-satisfied subset comprises:
  obtaining output predictions of the machine learning model with highest confidences; ordering the obtained output predictions by decreasing confidence;
  removing any prediction of the obtained output predictions for which there is no corresponding negative integrity constraint in the plurality of stored integrity constraints;
  selecting random subsets of the obtained output predictions;
  determining a loss for each of the random subsets; and
  selecting a maximum loss corresponding to the random subsets as the logic-based loss.

2. The method of claim 1, wherein the logic-based loss is inversely proportional to a satisfaction function, which measures how closely the output prediction for the each of the at least two objects and the output prediction for the relationship between the at least two objects satisfies the plurality of stored integrity constraints.

3. The method of claim 1, wherein the logic-based loss is determined using probabilistic logic.

4. The method of claim 1, wherein the logic-based loss is determined using fuzzy logic.

5. A system comprising:
  at least one processor, coupled to memory, configured to train a machine learning model comprising a plurality of neural network layers for scene graph generation, SGG, by:
  inputting a training image into the machine learning model, the training image depicting a scene comprising at least two objects;
  obtaining, from the machine learning model, a predicted label for the each of the at least two objects and a predicted label for a relationship between the at least two objects;
  determining a loss; and
  updating, based on the determined loss, weights for the plurality of neural network layers of the machine learning model, wherein the determining the loss comprises:
  determining a supervised loss by comparing the predicted label for the each of the at least two objects and the predicted label for the relationship between the at least two objects to actual labels corresponding to the training image; and
  determining a logic-based loss by comparing the predicted label for the each of the at least two objects and the predicted label for the relationship between the at least two objects to a plurality of stored integrity constraints, wherein the integrity constraints comprise positive integrity constraints expressing permissible relationships between objects, and negative integrity constraints expressing impermissible relationships between objects, wherein the at least one processor is configured to train the machine learning model by:
  selecting a maximally non-satisfied subset of the plurality of stored integrity constraints, and
  determining the logic-based loss based on the maximally non-satisfied subset, and wherein the at least one processor is configured to train the machine learning model by:
  obtaining output predictions of the machine learning model with highest confidences: ordering the obtained output predictions by decreasing confidence;
  removing any prediction of the obtained output predictions for which there is no corresponding negative integrity constraint in the plurality of stored integrity constraints;
  selecting random subsets of the obtained output predictions;
  determining a loss for each of the random subsets; and
  selecting a maximum loss corresponding to the random subsets as the logic-based loss.

6. The system of claim 5, wherein the logic-based loss is inversely proportional to a satisfaction function, which measures how closely the output prediction for the each of the at least two objects and the output prediction for the relationship between the at least two objects satisfies the plurality of stored integrity constraints.

7. The system of claim 5, wherein the logic-based loss is determined using probabilistic logic.

8. The system of claim 5, wherein the logic-based loss is determined using fuzzy logic.

9. A non-transitory machine-readable medium comprising instructions that, when executed by at least one processor of an electronic device, cause the at least one processor to train a machine learning model comprising a plurality of neural network layers for scene graph generation, SGG, by:
  inputting a training image into the machine learning model, the training image depicting a scene comprising at least two objects;
  obtaining, from the machine learning model, a predicted label for the each of the at least two objects and a predicted label for a relationship between the at least two objects;
  determining a loss; and
  updating, based on the determined loss, weights for the plurality of neural network layers of the machine learning model, wherein calculating the determining the loss comprises:
  determining a supervised loss by comparing the predicted label for the each of the at least two objects and the predicted label for the relationship between the at least two objects to actual labels corresponding to the training image; and
  determining a logic-based loss by comparing the predicted label for the each of the at least two objects and the predicted label for the relationship between the at least two objects to a plurality of stored integrity constraints, wherein the integrity constraints comprise positive integrity constraints expressing permissible relationships between objects, and negative integrity constraints expressing impermissible relationships between objects, wherein the instructions when executed cause the at least one processor to train the machine learning model by:
  selecting a maximally non-satisfied subset of the plurality of stored integrity constraints, and determining the logic-based loss based on the maximally non-satisfied subset, and wherein the instructions when executed cause the at least one processor to train the machine learning model by:
obtaining output predictions of the machine learning model with highest confidences; ordering the obtained output predictions by decreasing confidence;
removing any prediction of the obtained output predictions for which there is no corresponding negative integrity constraint in the plurality of stored integrity constraints;
selecting random subsets of the obtained output predictions;
determining a loss for each of the random subsets; and
selecting a maximum loss corresponding to the random subsets as the logic-based loss.

10. The non-transitory machine-readable medium of claim 9, wherein the logic-based loss is inversely proportional to a satisfaction function, which measures how closely the output prediction for the each of the at least two objects and the output prediction for the relationship between the at least two objects satisfies the plurality of stored integrity constraints.

11. The non-transitory machine-readable medium of claim 9, wherein the logic-based loss is determined using probabilistic logic.

12. The non-transitory machine-readable medium of claim 9, wherein the logic-based loss is determined using fuzzy logic.

* * * * *